(12) United States Patent
Ramachandran et al.

(10) Patent No.: US 9,025,856 B2
(45) Date of Patent: May 5, 2015

(54) ROBOT CONTROL INFORMATION

(75) Inventors: Mahesh Ramachandran, San Diego, CA (US); Christopher Brunner, San Diego, CA (US); Arvind Ramanandan, San Diego, CA (US); Abhishek Tyagi, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 13/604,470

(22) Filed: Sep. 5, 2012

(65) Prior Publication Data

US 2014/0064601 A1   Mar. 6, 2014

(51) Int. Cl.
G06K 9/00   (2006.01)
B25J 9/16   (2006.01)

(52) U.S. Cl.
CPC ..... *B25J 9/1697* (2013.01); *G05B 2219/36488* (2013.01); *G05B 2219/39449* (2013.01)

(58) Field of Classification Search
CPC ................................................ G06K 9/00664
USPC ........................................................ 382/153
See application file for complete search history.

(56) References Cited

U.S. PATENT DOCUMENTS

| | | | |
|---|---|---|---|
| 5,255,096 A | 10/1993 | Boyle | |
| 6,232,735 B1 | 5/2001 | Baba et al. | |
| 7,133,744 B2 | 11/2006 | Ito | |
| 7,653,458 B2 | 1/2010 | Koga et al. | |
| 2004/0189675 A1 | 9/2004 | Pretlove et al. | |
| 2005/0065653 A1 | 3/2005 | Ban et al. | |
| 2005/0131582 A1 | 6/2005 | Kazi et al. | |
| 2005/0251290 A1 | 11/2005 | Skourup et al. | |
| 2008/0019569 A1* | 1/2008 | Rhoads et al. | 382/107 |
| 2009/0157221 A1* | 6/2009 | Sip | 700/245 |
| 2010/0149337 A1 | 6/2010 | Porcino | |

FOREIGN PATENT DOCUMENTS

JP   2005110227 A   4/2005
WO   WO 2011149902 A2 * 12/2011

OTHER PUBLICATIONS (Xu Liu, "Fast Camera Motion Estimation for Hand-Held Devices and Applications", 2005; Proceeding MUM '05 Proceedings of the 4th international conference on Mobile and ubiquitous multimedia pp. 103-108).*

(Continued)

*Primary Examiner* — Stephen R Koziol
*Assistant Examiner* — Totam Le
(74) *Attorney, Agent, or Firm* — Silicon Valley Patent Group LLP (57) ABSTRACT

Vision based tracking of a mobile device is used to remotely control a robot. For example, images captured by a mobile device, e.g., in a video stream, are used for vision based tracking of the pose of the mobile device with respect to the imaged environment. Changes in the pose of the mobile device, i.e., the trajectory of the mobile device, are determined and converted to a desired motion of a robot that is remote from the mobile device. The robot is then controlled to move with the desired motion. The trajectory of the mobile device is converted to the desired motion of the robot using a transformation generated by inverting a hand-eye calibration transformation.

23 Claims, 5 Drawing Sheets

(56) References Cited

OTHER PUBLICATIONS

Dornaika, et al., "Simultaneous robot-world and hand-eye calibration," Robotics and Automation, IEEE Transactions on, vol. 14, No. 4, pp. 617-622, Aug. 1998.

International Search Report and Written Opinion—PCT/US2013/056649—ISA/EPO—Oct. 24, 2013.

Pettersen, T., et al., "Augmented reality for programming industrial robots", Mixed and Augmented Reality, 2003. Proceedings. The Second IEEE and AC M International Symposium on Oct. 7-10, 2003, Piscataway, NJ, USA, IEEE, Oct. 7, 2003, pp. 319-320, XP010662847, DOI: 10.1109/ISMAR.2003.1240739 ISBN : 978-0-7695-2006-3 the whole document.

Lieberknecht, S., et al., "A Dataset and Evaluation Methodology for Template-based Tracking Algorithms," IEEE International Symposium on Mixed and Augmented Reality 2009, Science and Technology Proceedings; Orlando, Florida, USA; Oct. 19-22, 2009; pp. 145-151.

* cited by examiner

ROBOT CONTROL INFORMATION

BACKGROUND

1. Background Field

Embodiments of the subject matter described herein are related generally to robotic arms, and more particularly to controlling the motion of robotic arms.

2. Relevant Background

Robotic arms are sometimes used to move objects, e.g., in a highly accurate fashion, but repetitious fashion. Controlling the robot arm, e.g., specifying the desired movement or trajectories, can be difficult and time consuming. For example, robot arms may be programmed by manually moving the robot arm to the various desired positions. However, the resulting motion of the robot arm may be unintended. By way of example, it may be desired for the robot arm to mimic typical hand motions. Manually moving the robot arm is unlikely to produce the natural movements found in hand motions.

SUMMARY

Vision based tracking of a mobile device is used to remotely control a robot. For example, images captured by a mobile device, e.g., in a video stream, are used for vision based tracking of the pose of the mobile device with respect to the imaged environment. Changes in the pose of the mobile device, i.e., the trajectory of the mobile device, are determined and converted to a desired motion of a robot that is remote from the mobile device. The robot is then controlled to move with the desired motion. The trajectory of the mobile device is converted to the desired motion of the robot using a transformation generated by inverting a hand-eye calibration transformation.

In one implementation, a method includes moving a mobile device with a desired motion for a robot that is remote from the mobile device, the mobile device having a camera; determining a trajectory of the mobile device using images captured by the camera; converting the trajectory of the mobile device into the desired motion of the robot; and controlling the robot to move with the desired motion.

In one implementation, a mobile device includes a camera for capturing images of an environment while the mobile device is moved; a wireless interface for communicating with a remote robot controller; and a processor coupled to receive the captured images and coupled to the wireless interface, the processor configured to determine a trajectory of the mobile device using the captured images, convert the trajectory of the mobile device into a desired motion of a remote robot, and to cause the wireless interface to transmit the desired motion of the remote robot to the remote robot controller.

In one implementation, a controller for controlling a robot, the controller includes an external interface for communicating with a remote mobile device that has a camera for capturing images of an environment while moving with a desired motion for the robot; a robot interface for communicating and controlling a robot; and a processor coupled to the external interface and the robot interface, the processor being configured to convert a trajectory of the remote mobile device determined using the captured images to a desired motion of the robot, and control the robot to move with the desired motion through the robot interface.

In one implementation, a system includes means for determining a trajectory of a mobile device using images captured by the mobile device while the mobile device is moved with a desired motion for a robot that is remote from the mobile device; means for converting the trajectory of the mobile device into the desired motion of the robot; and means for controlling the robot to move with the desired motion.

In one implementation, a storage medium includes program code stored thereon, including program code to determine a trajectory of a mobile device using images captured by the mobile device while the mobile device is moved with a desired motion for a robot that is remote from the mobile device; program code to convert the trajectory of the mobile device into the desired motion of the robot; and program code to control the robot to move with the desired motion.

DETAILED DESCRIPTION

Figure 1:
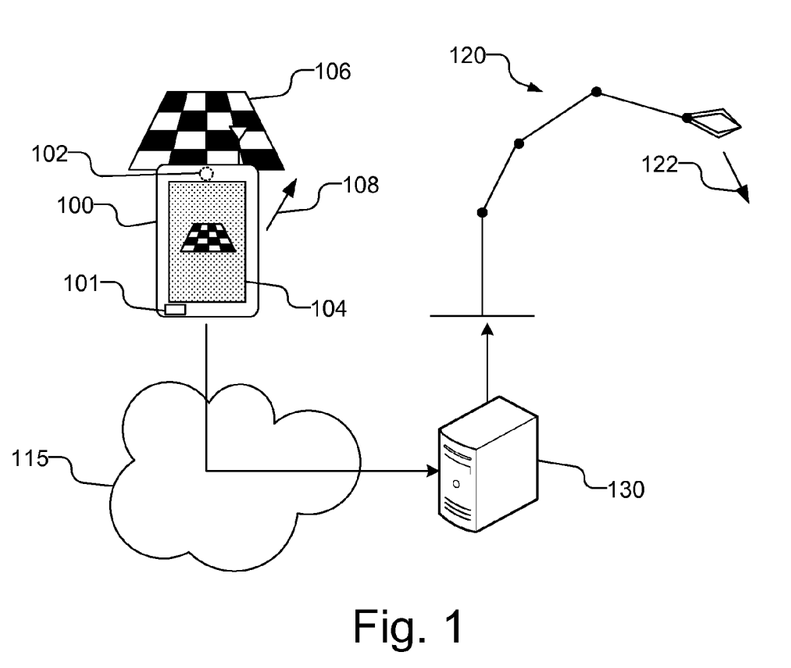
FIG. 1 illustrates a system that includes a mobile device with a camera that can be used to control the motion of a remote robot.

FIG. 1 illustrates a system that includes a mobile device 100 with a camera 102 that can be used to control the motion of a robot arm 120. The mobile device 100 includes a vision based tracking module 101 that tracks the pose of the mobile device 100 with respect to an environmental object 106 using vision based tracking, which is often used in applications such as Augmented Reality. As illustrated in FIG. 1, the mobile device 100 communicates to a controller 130 for the robot arm 120 through a wireless network 115 and the changes in the pose of the mobile device 100, i.e., the trajectory of the mobile device 100, is transformed into instructions to control the robot arm 120.

Thus, using the mobile device 100, a robot, such as a robot arm 120, may be programmed or controlled to replicate the motion of the mobile device 100 while it is held in the user's hand using vision based tracking. The robot may be controlled, for example, to move a gripper at the end of an arm, or to move other aspects of the robot, including moving the entire robot. The use of the mobile device 100 to control or program a robot arm 120 may find use in testing, as well as in situations where automation is needed (for example instructional purposes, gaming stalls, etc.). In remote operation, the robot can mimic hand motion in real time as measured by a vision based tracking module on a mobile device, such as those used with Augmented Reality. In game stalls, a robot can replicate a player's trajectory. In a testing environment, the use of the vision based tracking module in mobile device 100 to program or control the movement of the robot arm can replace the time consuming conventional process of programming robot trajectories. Additionally, a robot may be controlled in real-time remotely for, e.g., disaster management. The robot can mimic the hand motion or other desired motion either in real time as the hand moves, or offline, by saving the hand motion in a file so that the robot can move accordingly at a later time.

As used herein, a mobile device refers to any portable electronic device such as a cellular or other wireless communication device, personal communication system (PCS) device, personal navigation device (PND), Personal Information Manager (PIM), Personal Digital Assistant (PDA), or other suitable mobile device. The mobile device may be capable of receiving wireless communication and may be capable of wired communications. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all electronic devices, including wireless communication devices, computers, laptops, tablet computers, etc. capable of capturing images (or video) of its environment.

Mobile device 100 uses vision based tracking to track the pose with respect to the environment. For example, the mobile device 100 captures an image, illustrated in display 104, of the environmental object 106, from which the current pose of the mobile device 100 with respect to the object 106 is determined. Changes in the pose, i.e., the trajectory, of the mobile device 100 with respect to the object 106, as illustrated by arrow 108, can thereby be determined, e.g., either by the mobile device 100 or the controller 130. The trajectory of the mobile device 100 is converted to instructions for the movement of the robot arm 120 using a transformation, e.g., either by the mobile device 100 or the controller 130. For example, the trajectory of the mobile device 100 may be converted to a desired motion for the robot expressed in an internal coordinate system for the robot. The controller 130 can then control the robot arm 120 to move, as illustrated by arrow 122, based on the trajectory of the mobile device 100. If desired, the mobile device 100 may be used to control the robot arm 120 in real time or may be used to program the movement of the robot arm 120, after which the robot arm 120 moves without further input from the mobile device 100.

Some or all of the current pose of the mobile device 100, the trajectory of the mobile device, and the transformation of the trajectory of the mobile device to instructions for the movement of the robot arm 120 may be determined by the mobile device 100 or the controller 130. For example, the mobile device 100 may provide captured image data, e.g., captured images or features extracted from the images, via network 115 to the controller 130 and the controller 130 may determine the current pose of the mobile device 100 using vision based tracking, as well as the trajectory and transformation of the trajectory. Alternatively, the mobile device 100 may determine the current pose and provide the current pose to the controller 130 via the network, where the controller 130 then determines the trajectory of the mobile device 100 and the transformation of the trajectory. The mobile device 100 may determine the current pose and trajectory and provide the trajectory to the controller 130 via the network 115, where the controller 130 determines the transformation of the trajectory. The mobile device 100 may determine the current pose, trajectory, and transformation of the trajectory and provide the transformation of the trajectory the controller 130 via the network 115.

Figure 2:
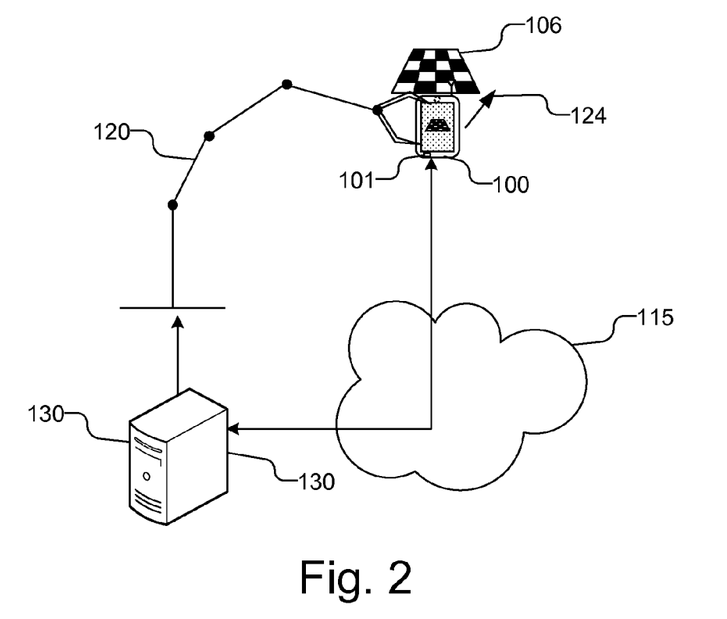
FIG. 2 illustrates the hand-eye calibration process used to generate the transformation for converting the trajectory of the mobile device to a desired motion of the robot.

The transformation of the trajectory of the mobile device 100 to the movement of the robot arm 120 may be performed using a transformation produced using the well-known hand-eye calibration process. FIG. 2 illustrates, by way of example, the hand-eye calibration process in which the mobile device 100 is held by the robot arm 120. By moving the mobile device 100 with the robot arm 120 with a predetermined motion, as illustrated by arrow 124, a training trajectory of the mobile device 100 is determined. Based on the predetermined motion and the training trajectory, a hand-eye calibration is generated, which serves as the calibration transformation. The transformation to convert the trajectory of the mobile device 100 to instructions for movement of the robot arm 120 is produced by inverting the hand-eye calibration. The calibration transformation may be generated by providing the training trajectory from the mobile device 100 to the robot arm controller 130, e.g., via the wireless network 115, where the controller 130 determines and inverts the hand-eye calibration. Alternatively, the calibration transformation may be generated by providing the predetermined motion of the robot arm 120 to the mobile device 100 via the wireless network 115 and the mobile device 100 determines the calibration transformation and if desired inverts the calibration transformation.

Figure 3:
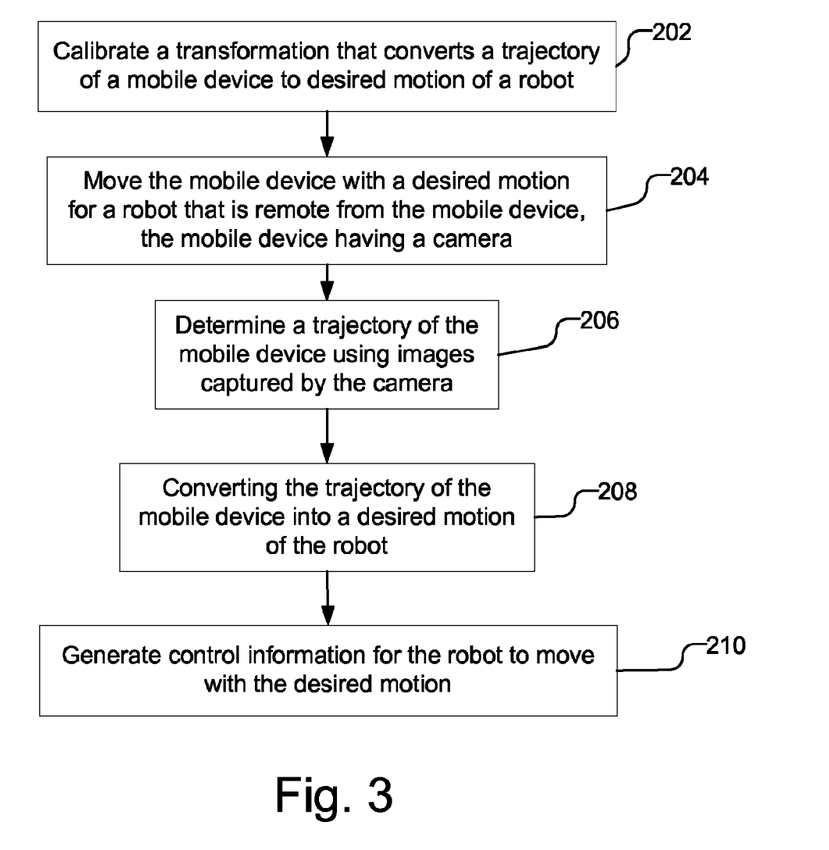
FIG. 3 is a flow chart illustrating a method of controlling a robot using a remote mobile device based on vision based tracking

FIG. 3 is a flow chart illustrating a method of controlling a robot, such as a robot arm or other appropriate type of robot, using a mobile device with vision based tracking As can be seen, a transformation that converts a trajectory of a mobile device to a desired motion of the robot is calibrated (202). The mobile device with a camera is moved with a desired motion for a robot that is remote from the mobile device (204). The trajectory of the mobile device is determined using images (e.g., the video stream) captured by the camera (206). The trajectory may be determined, e.g., by detecting changes in a pose between the mobile device and an imaged object. The trajectory of the mobile device is converted into a desired motion of the robot (208). For example, the trajectory of the mobile device 100 may be converted to a desired motion for the robot expressed in an internal coordinate system for the robot. Control information may be generated for the robot to move with the desired motion (210). Generating control information may include controlling the robot, for example, to move a gripper at the end of an arm, or to move other aspects of the robot, including moving the entire robot. The generated control information for the robot to move with the desired motion may be used to program the robot with the desired motion or to control the robot in real-time or offline.

Figure 4:
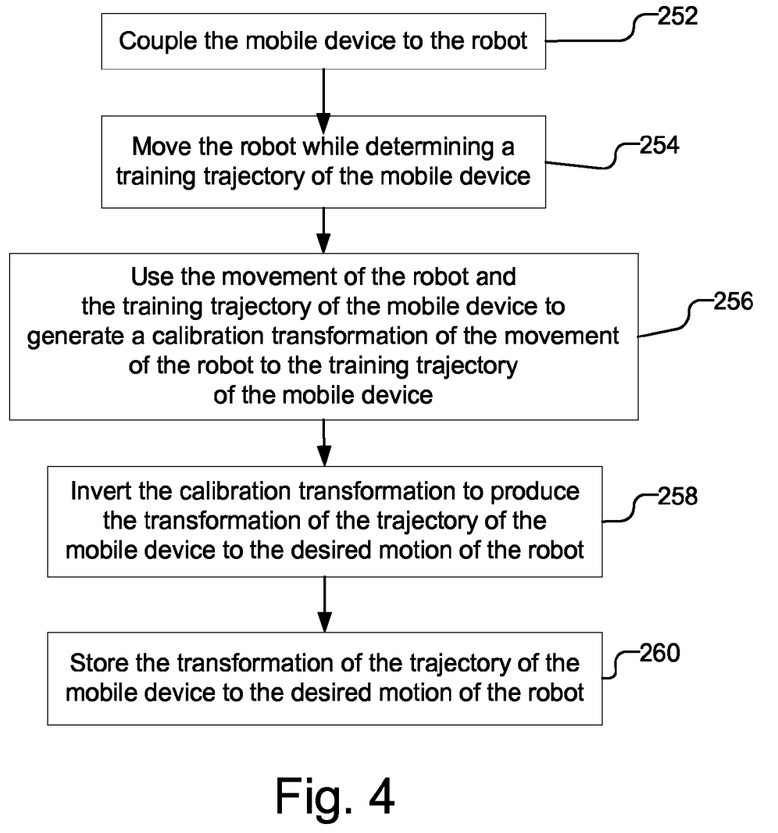
FIG. 4 is a flow chart illustrating a method of calibrating the transformation of a trajectory of a mobile device to a desired motion of the robot.

FIG. 4 is a flow chart illustrating a method of calibrating the transformation to convert a trajectory of a mobile device to a desired motion of the robot discussed in step 202 of FIG. 3. As can be seen in FIG. 3, the mobile device is coupled to the robot (252). For example, the robot arm may hold the mobile device or the mobile device may be otherwise temporarily attached to the robot. The robot is moved while determining a training trajectory of the mobile device (254). For example, as the robot is moved, the mobile device captures images of an object in the environment from which the pose of the mobile device relative to the object is determined, followed by determining the trajectory or change in pose. Using the movement of the robot and the training trajectory of the mobile device, a calibration transformation of the movement of the robot to the training trajectory of the mobile device is generated (256). Thus, for example, the calibration transformation may be generated for the movement of the robot as expressed in an internal coordinate system for the robot to the training trajectory of the mobile device 100. The calibration transformation is inverted to produce the transformation of the trajectory of the mobile device to the desired motion of the robot (258), which is stored in memory (260).

Figure 5:
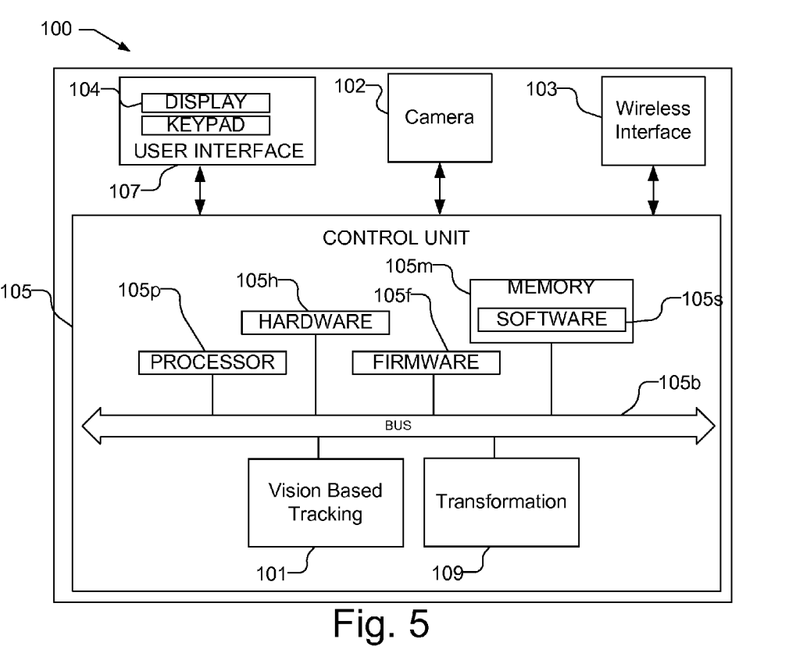
FIG. 5 is a block diagram of a mobile device capable of vision based tracking and communicating to control or program a remote robot.

FIG. 5 is a block diagram of a mobile device 100 capable of vision based tracking and communicating to control or program a remote robot. The mobile device 100 includes a camera 102 for capturing images, e.g., in a video stream. The mobile device 100 further includes a wireless interface 103 that is used to communicate with a robot via network 115, shown in FIG. 1, e.g., via a controller 130. As discussed above, the mobile device 100 may transmit image data, e.g., either the images or features extracted from the images, via the wireless interface 103, where the controller 130 uses the image data to track the mobile device 100 and control the robot accordingly. Alternatively, the mobile device 100 may track its pose and transmit the pose data, i.e., either the current pose or trajectory, via the wireless interface 103, where the controller 130 uses the pose data to control the robot accordingly. Additionally, the mobile device 100 may track its pose and transform the pose data to instructions for controlling the robot, which may be transmitted via the wireless interface 103.

The wireless interface 103 may be used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATS) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The mobile device 100 may further includes a user interface 107 that includes a display 104, a keypad or other input device through which the user can input information into the mobile device 100. If desired, the keypad may be obviated by integrating a virtual keypad into the display 104 with a touch sensor. The user interface 107 may also include a microphone and speaker, e.g., if the mobile device 100 is a cellular telephone or the like. Of course, mobile device 100 may include other elements unrelated to the present disclosure.

The mobile device 100 also includes a control module 105 that is connected to and communicates with the camera 102 and wireless interface 103. The control module 105 accepts and processes the images from the camera 102 and provides data to the wireless interface 103 for transmission via network 115. The control module 105 may be provided by a bus 105$b$, processor 105$p$ and associated memory 105$m$, hardware 105$h$, firmware 105$f$, and software 105$s$. The control module 105 is further illustrated as including a vision based tracking module 101, which tracks the pose of the mobile device 100 relative to the environment using vision based tracking of the images provided by camera 102. Mobile device 100 may use any known type of vision based tracking The vision based tracking module 101 provides the pose data, which is transformed into instructions for controlling robot. For example, the pose data provided by vision based tracking module 101 may be the trajectory of the mobile device, i.e., the change in pose of the mobile device, or simply the current pose of the mobile device 100, which may be provided to the controller 130 where the controller 130 determines the trajectory of the mobile device 100. Additionally, as illustrated in FIG. 5, the mobile device 100 may further include a transformation module 109 that transforms the pose data into the desired motion of the robot, which may be transmitted by the wireless interface 103.

The vision based tracking module 101 and transformation module 109 are illustrated separately from each other and from processor 105$p$ for clarity, but may be part of the processor 105$p$ or implemented in the processor based on instructions in the software 105$s$ which is run in the processor 105$p$. It will be understood as used herein that the processor 105$p$ can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 105$h$, firmware 113$f$, software 105$s$, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 105$m$ and executed by the processor 105$p$. Memory 105$m$ may be implemented within or external to the processor 105$p$. If implemented in firmware and/or software, the functions may be stored as one or more instructions or code on a storage medium that is computer-readable, wherein the storage medium does not include transitory propagating signals. Examples include storage media encoded with a data structure and storage encoded with a computer program. Storage media includes physical computer storage media. A storage medium may be any available medium that can be accessed by a computer. By way of example, and not limitation, such storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of storage media.

Figure 6:
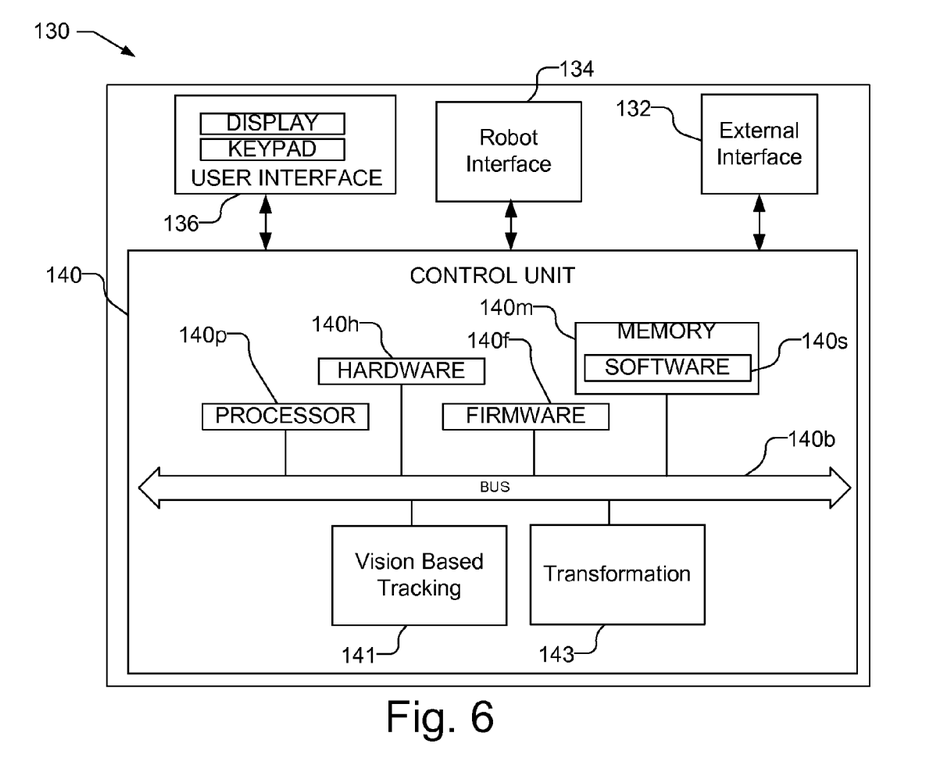
FIG. 6 is a block diagram of a controller capable of controlling a robot based on vision based tracking information wirelessly provided by a remote mobile device.

FIG. 6 is a block diagram of a controller 130 capable of controlling a robot based on vision based tracking information wirelessly provided by a remote mobile device 100. The controller 130 includes an external interface 132 that is used to receive image data, e.g., either the images or features extracted from the images captured by the mobile device 100, or pose data, e.g., the trajectory or current pose of the mobile device 100, via then network 115.

The external interface 132 may be a wired interface to a router (not shown) or a wireless interface used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The controller 130 further includes a robot interface 134 through which the controller 130 can control the robot. The robot interface may be any wired or wireless interface. The controller 130 may further include a user interface 136 that may include e.g., a display, as well as a keypad or other input device through which the user can input information into the controller 130.

The controller 130 also includes a control module 140 that is connected to and communicates with external interface 132 and robot interface 134. The control module 140 accepts and processes the pose data or image data received from the mobile device 100 via external interface 132 and controls the robot via the robot interface 134 in response. The control module 140 may be provided by a bus 140b, processor 140p and associated memory 140m, hardware 140h, firmware 140f, and software 140s. The control module 140 may further include a vision based tracking module 141 to track the pose of the mobile device 100 relative to the environment using vision based tracking if image data is provided by mobile device 100. Controller 130 may use any known type of vision based tracking The vision based tracking module 141 provides the trajectory, which is transformed into instructions for controlling robot. The controller 130 includes a transformation module 143 that transforms the pose data received either from the mobile device 100 via external interface 132 or from the vision based tracking module 141 into the desired motion of the robot, which is transmitted to the robot via robot interface 134.

The vision based tracking module 141 and transformation module 143 are illustrated separately from each other and from processor 140p for clarity, but may be part of the processor 140p or implemented in the processor based on instructions in the software 140s which is run in the processor 140p. It will be understood as used herein that the processor 140p can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 140h, firmware 140f, software 140s, or any combination thereof. For a hardware implementation, the processing modules may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 140m and executed by the processor 140p. Memory 140m may be implemented within or external to the processor 140p. If implemented in firmware and/or software, the functions may be stored as one or more instructions or code on a storage medium that is computer-readable, wherein the storage medium does not include transitory propagating signals. Examples include storage media encoded with a data structure and storage encoded with a computer program. Storage media includes physical computer storage media. A storage medium may be any available medium that can be accessed by a computer. By way of example, and not limitation, such storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of storage media.

Thus, a system includes a means for determining a trajectory of a mobile device using images captured by the mobile device while the mobile device is moved with a desired motion for a robot that is remote from the mobile device, which may be, e.g., vision based tracking modules 101, 141 or processors 105p, 140p performing instructions received from software 104s, 140s. Means for converting the trajectory of the mobile device into the desired motion of the robot may be, e.g., transformation modules 109, 143, or processors 105p, 140p performing instructions received from software 104s, 140s. Means for controlling the robot to move with the desired motion may be, e.g., processor 105p causing wireless interface 103 to provide the desired motion to the controller 130 via network 115 or processor 140p causing robot interface 134 to provide appropriate control signals to the robot. Additionally, the system may further include a means for calibrating a transformation of the trajectory of the mobile device to the desired motion of the robot, which may be, e.g., transformation modules 109, 143, or processors 105p, 140p performing instructions received from software 104s, 140s.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   moving a mobile device with a desired motion for a robot that is remote from the mobile device, the mobile device having a camera;
   determining a trajectory of the mobile device using images captured by the camera;
   converting the trajectory of the mobile device into the desired motion of the robot;
   generating control information for the robot to move with the desired motion;
   the method further comprises calibrating a transformation that converts the trajectory of the mobile device to the desired motion of the robot, wherein converting the trajectory of the mobile device into the desired motion of the robot comprises using the transformation, wherein calibrating the transformation comprises:
   coupling the mobile device to the robot;
   moving the robot while determining a training trajectory of the mobile device;
   using movement of the robot and the training trajectory of the mobile device to generate a calibration transformation of the movement of the robot to the training trajectory of the mobile device; and
   inverting the calibration transformation to produce the transformation of the trajectory of the mobile device to the desired motion of the robot.

2. The method of claim 1, wherein generating control information for the robot to move with the desired motion comprises programming the robot with the desired motion.

3. The method of claim 1, wherein generating control information for the robot to move with the desired motion comprises controlling the robot in real-time or offline.

4. The method of claim 1, wherein determining the trajectory of the mobile device using the images captured by the camera comprises detecting changes in a pose between the mobile device and an imaged object.

5. The method of claim 1, wherein the robot is a robot arm.

6. The method of claim 1, wherein the trajectory of the mobile device is converted into an internal coordinate system for the robot.

7. A mobile device comprising:
   a camera for capturing images of an environment while the mobile device is moved;
   a wireless interface for communicating with a remote robot controller; and
   a processor coupled to receive captured images from the camera and coupled to the wireless interface, the processor configured to determine a trajectory of the mobile device using the captured images, convert the trajectory of the mobile device into a desired motion of a remote robot, and to cause the wireless interface to transmit the desired motion of the remote robot to the remote robot controller, the processor being further configured to calibrate a transformation that converts the trajectory of the mobile device to the desired motion of the remote robot, wherein the processor is configured to convert the trajectory of the mobile device into the desired motion of the remote robot using the transformation, wherein the processor is configured to calibrate the transformation that converts the trajectory of the mobile device to the desired motion of the remote robot by being configured to:
   determine a training trajectory of the mobile device while the remote robot holds the mobile device and during movement of the remote robot;
   use the movement of the remote robot and the training trajectory to generate a calibration transformation of the movement of the remote robot to the training trajectory of the mobile device; and
   invert the calibration transformation to produce the transformation of the trajectory of the mobile device to the desired motion of the remote robot.

8. The mobile device of claim 7, wherein the processor is configured to determine the trajectory of the mobile device using the captured images by being configured to detect changes in a pose between the mobile device and an imaged object.

9. A controller for controlling a robot, the controller comprising:
   an external interface for communicating with a remote mobile device that has a camera for capturing images of an environment while moving with a desired motion for the robot;
   a robot interface for communicating and controlling the robot; and
   a processor coupled to the external interface and the robot interface, the processor being configured to convert a trajectory of the remote mobile device determined using captured images from the camera to the desired motion of the robot, and control the robot to move with the desired motion through the robot interface, wherein the processor is further configured to calibrate a transformation that converts the trajectory of the remote mobile device to the desired motion of the robot, wherein the processor is configured to convert the trajectory of the remote mobile device into the desired motion of the robot using the transformation, wherein the processor is configured to calibrate the transformation that converts the trajectory of the remote mobile device to the desired motion of the robot by being configured to:
   cause movement of the robot while the robot holds the remote mobile device;
   use the movement of the robot and a training trajectory of the remote mobile device determined from the movement of the robot while holding the remote mobile device to generate a calibration transformation of the movement of the robot to the training trajectory of the remote mobile device; and
   invert the calibration transformation to produce the transformation of the trajectory of the remote mobile device to the desired motion of the robot.

10. The controller of claim 9, wherein the processor receives the trajectory from the remote mobile device through the external interface.

11. The controller of claim 9, wherein the processor receives pose data from the remote mobile device through the external interface, the processor being further configured to determine the trajectory of the remote mobile device using the pose data.

12. The controller of claim 9, wherein the processor receives image data from the remote mobile device through the external interface, the processor being further configured to determine the trajectory of the remote mobile device using the image data.

13. The controller of claim 12, wherein the processor is configured to determine the trajectory of the remote mobile device using the image data by being configured to detect changes in a pose between the remote mobile device and an imaged object.

14. The controller of claim 9, wherein the processor is configured to control the robot to move with the desired motion by being configured to program the robot with the desired motion.

15. The controller of claim 9, wherein the processor is configured to control the robot to move with the desired motion by being configured to control the robot in real-time or offline.

16. The controller of claim 9, wherein the robot is a robot arm.

17. The controller of claim 9, wherein the trajectory of the remote mobile device is converted into an internal coordinate system for the robot.

18. A system comprising:
    means for determining a trajectory of a mobile device using images captured by the mobile device while the mobile device is moved with a desired motion for a robot that is remote from the mobile device;
    means for converting the trajectory of the mobile device into the desired motion of the robot;
    means for generating control information for the robot to move with the desired motion; and
    means for calibrating a transformation that converts the trajectory of the mobile device to the desired motion of the robot, wherein the means for converting the trajectory of the mobile device into the desired motion of the robot uses the transformation, wherein the means for calibrating the transformation determines a training trajectory of the mobile device while the robot holds the mobile device and during movement of the robot, uses the movement of the robot and the training trajectory to generate a calibration transformation of the movement of the robot to the training trajectory of the mobile device; and inverts the calibration transformation to produce the transformation of the trajectory of the mobile device to the desired motion of the robot.

19. The system of claim 18, wherein the means for generating control information for the robot programs the robot with the desired motion.

20. The system of claim 18, wherein the means for generating control information for the robot controls the robot in real-time or offline.

21. The system of claim 18, wherein the means for determining the trajectory of the mobile device using the images captured by the mobile device detects changes in a pose between the mobile device and an imaged object.

22. The system of claim 18, wherein the trajectory of the mobile device is converted into an internal coordinate system for the robot.

23. A storage medium including program code stored thereon, comprising:
    program code to determine a trajectory of a mobile device using images captured by the mobile device while the mobile device is moved with a desired motion for a robot that is remote from the mobile device;
    program code to convert the trajectory of the mobile device into the desired motion of the robot;
    program code to generate control information for the robot to move with the desired motion; and
    program code to calibrate a transformation that converts the trajectory of the mobile device to the desired motion of the robot, wherein the program code to convert the trajectory of the mobile device into the desired motion of the robot uses the transformation, the program code to calibrate the transformation comprises:
        program code to determine a training trajectory of the mobile device while the robot holds the mobile device and during movement of the robot;
        program code to use the movement of the robot and the training trajectory to generate a calibration transformation of the movement of the robot to the training trajectory of the mobile device; and
        program code to invert the calibration transformation to produce the transformation of the trajectory of the mobile device to the desired motion of the robot.

* * * * *